US012551970B2

(12) United States Patent
Pagan et al.

(10) Patent No.: US 12,551,970 B2
(45) Date of Patent: Feb. 17, 2026

(54) SYSTEMS AND METHODS FOR ULTRASONIC ADDITIVE MANUFACTURING OF METALS

(71) Applicant: UNIVERSITY OF TENNESSEE RESEARCH FOUNDATION, Knoxville, TN (US)

(72) Inventors: Michael Barnes Pagan, Knoxville, TN (US); Steven Zinkle, Knoxville, TN (US); Sudarsanam Babu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 125 days.

(21) Appl. No.: 18/326,310

(22) Filed: May 31, 2023

(65) Prior Publication Data

US 2024/0017348 A1 Jan. 18, 2024

Related U.S. Application Data

(60) Provisional application No. 63/347,538, filed on May 31, 2022.

(51) Int. Cl.
*B23K 20/00* (2006.01)
*B23K 20/10* (2006.01)
*B33Y 10/00* (2015.01)
*B23K 103/14* (2006.01)

(52) U.S. Cl.
CPC .......... *B23K 20/103* (2013.01); *B33Y 10/00* (2014.12); *B23K 2103/14* (2018.08)

(58) Field of Classification Search
CPC ............ B23K 2103/18; B23K 2101/34; B23K 26/323; B23K 20/02; B23K 13/00; B23K 20/10; B23K 2103/08; B23K 2103/14
See application file for complete search history.

(56) References Cited

U.S. PATENT DOCUMENTS

| 7,935,908 | B2* | 5/2011 | Nakagawa | B23K 26/0093 |
| | | | | 228/125 |
| 8,492,005 | B2* | 7/2013 | Nakagawa | B23K 20/02 |
| | | | | 228/208 |
| 9,346,120 | B1* | 5/2016 | Graff | B06B 3/00 |
| 9,505,084 | B2* | 11/2016 | Nakagawa | B23K 20/2333 |

(Continued)

OTHER PUBLICATIONS

Mo et al. (A Review on Diffusion Bonding Between Titanium Alloys and Stainless Steel, Advances in Materials Science and Engineering, Sep. 20, 2018) (Year: 2018).*

(Continued)

*Primary Examiner* — Erin B Saad
(74) *Attorney, Agent, or Firm* — FisherBroyles, LLP; Jason M. Pass; James Pohl (57) ABSTRACT

Provided are methods and apparatus for bonding metals. In an example, a provided method includes (i) disposing a layer of Vanadium onto a first Titanium surface of a first tangible object, (ii) placing a second Titanium surface of a second tangible object in direct contact with the layer of Vanadium, and (iii) imparting, using a sonotrode, compressive and shear forces to the first Titanium surface, the layer of Vanadium, and the second Titanium surface, to cause plastic deformation that bonds the first Titanium surface to the second Titanium surface.

19 Claims, 4 Drawing Sheets
(2 of 4 Drawing Sheet(s) Filed in Color)

(56) References Cited

U.S. PATENT DOCUMENTS

| | | | | |
|---|---|---|---|---|
| 11,872,651 | B2* | 1/2024 | Fujii | B23K 20/16 |
| 2002/0061417 | A1* | 5/2002 | Shindo | B23K 20/24 |
| | | | | 428/665 |
| 2006/0150387 | A1* | 7/2006 | Kobayashi | B23K 20/2275 |
| | | | | 29/458 |
| 2008/0026247 | A1* | 1/2008 | Nakagawa | B23K 33/008 |
| | | | | 428/656 |
| 2008/0241572 | A1* | 10/2008 | Miyamoto | B23K 11/115 |
| | | | | 219/118 |
| 2009/0050608 | A1* | 2/2009 | Hayashi | B23K 11/115 |
| | | | | 219/121.64 |
| 2011/0052935 | A1* | 3/2011 | Nakagawa | B23K 20/02 |
| | | | | 228/125 |
| 2011/0123825 | A1* | 5/2011 | Sakurai | B23K 26/22 |
| | | | | 219/148 |
| 2011/0159313 | A1* | 6/2011 | Kasukawa | B23K 20/227 |
| | | | | 228/208 |
| 2013/0071686 | A1* | 3/2013 | Oda | B32B 15/017 |
| | | | | 148/503 |
| 2022/0402065 | A1* | 12/2022 | Ramirez | B32B 15/012 |

OTHER PUBLICATIONS

Chen, Y-C., et al. "HAZ development and accelerated post-weld natural ageing in ultrasonic spot welding aluminium 6111-T4 automotive sheet." Acta Materialia 60.6-7 (2012): 2816-2828.

Dehoff, R. R., and S. S. Babu. "Characterization of interfacial microstructures in 3003 aluminum alloy blocks fabricated by ultrasonic additive manufacturing." Acta Materialia 58.13 (2010): 4305-4315.

Fujii, Hiromichi T., et al. "Microstructure and lap shear strength of the weld interface in ultrasonic welding of Al alloy to stainless steel." Scripta Materialia 116 (2016): 135-138.

Haddadi, Farid, and Dimitrios Tsivoulas. "Grain structure, texture and mechanical property evolution of automotive aluminium sheet during high power ultrasonic welding." Materials Characterization 118 (2016): 340-351.

Leyens, Christoph, and Manfred Peters, eds. Titanium and Titanium Alloys: Fundamentals and Applications. Wiley-vch, 2003.

Lütjering, G., et al. "Titanium," Engineering Materials and Processes, 2nd Edition, 449 pages.

Massey, Caleb P., et al. "Ultrasonic additive manufacturing of zirconium: Pilot results." Materials Letters 302 (2021): 130330.

Pagan, Michael, et al. "Interdiffusion of elements during ultrasonic additive manufacturing." Metallurgical and Materials Transactions A 52 (2021): 1142-1157.

Pagan, Michael, et al. "Strengthening effects at dissimilar metal interfaces created by ultrasonic additive manufacturing." Metallurgical and Materials Transactions A 53.10 (2022): 3547-3564.

Pagan, Michael, et al. "Strengthening of pretreated aluminum during ultrasonic additive manufacturing." Additive Manufacturing 60 (2022): 103228.

Patel, V. K. et al., "Influence of ultrasonic spot welding on microstructure in a magnesium alloy." Scripta Materialia 65.10 (2011): 911-914.

R. Boyer, G. Welsh, E.W. Collings, Materials properties handbook: titanium alloys, Materials Park, OH: ASM International, 1994. pdf https://books.google.com/books?hl=en&lr=&id=x3rToHWOcD8C&oi=fnd&pg=PA1&dq=R.+Boyer,+G.+Welsh,+E.W.+Collings,+Materials+properties+handbook:+titanium+alloys,+Materials+Park,+OH:+ASM+International,+1994.+pdf&ots=x8x2QGdlkZ&sig=wl8yAvmyB3Wto6dlA83IQuZtudA#v=onepage&q&f=false.

Smirnov, Grigory. "Non-Arrhenius diffusion in bcc titanium: Vacancy-interstitialcy model." Physical Review B 102.18 (2020): 184110.

Sridharan, Niyanth, et al. "Microstructure and texture evolution in aluminum and commercially pure titanium dissimilar welds fabricated using ultrasonic additive manufacturing." Scripta Materialia 117 (2016): 1-5.

Sriraman, M. R., et al. "Bond characterization in very high power ultrasonic additive manufacturing." (2010).

Sriraman, M. R., et al. "Thermal transients during processing of 3003 Al—H18 multilayer build by very high-power ultrasonic additive manufacturing." Metallurgical and Materials Transactions B 43 (2012): 133-144.

Sriraman, M. R., et al. "Thermal transients during processing of materials by very high power ultrasonic additive manufacturing." Journal of Materials Processing Technology 211.10 (2011): 1650-1657.

Sriraman, M. R., S. S. Babu, and M. Short. "Bonding characteristics during very high power ultrasonic additive manufacturing of copper." Scripta Materialia 62.8 (2010): 560-563.

Stringer, J. "The vanadium-oxygen system—A review." Journal of the Less Common Metals 8.1 (1965): 1-14.

Tunde Raji, Abdulrafiu, et al. "Ab initio pseudopotential study of vacancies and self-interstitials in hcp titanium." Philosophical Magazine 89.20 (2009): 1629-1645.

Ward, Austin A., et al. "Grain growth during ultrasonic welding of nanocrystalline alloys." Journal of Materials Processing Technology 254 (2018): 373-382.

* cited by examiner

SYSTEMS AND METHODS FOR ULTRASONIC ADDITIVE MANUFACTURING OF METALS

CROSS-REFERENCE TO RELATED APPLICATION

This application claims the benefit of U.S. Provisional Patent Application No. 63/347,538, titled "SYSTEMS AND METHODS FOR ULTRASONIC ADDITIVE MANUFACTURING OF METALS", filed May 31, 2022, the disclosure of which is incorporated herein by reference in its entirety.

STATEMENT REGARDING FEDERALLY SPONSORED RESEARCH

This invention was made with United States Government support under (i) Lois ID: 8779 awarded by the U.S. Department of Energy (DOE) and (ii) Contract FA864920P0998 awarded by the United States Air Force. The United States Government has certain rights in the invention.

FIELD OF DISCLOSURE

This disclosure relates generally to the technical field of material science, and more specifically, but not exclusively, to methods and apparatus for ultrasonic additive manufacturing of metals.

BACKGROUND

Conventional Ultrasonic Additive Manufacturing (UAM) can be used to bind layers of some types of materials together to manufacture products and prototypes. However, some materials, such as titanium, do not sufficiently bond during conventional UAM processes. For example, Titanium pieces fracture, tear, break, refuse to bond, or bond to a UAM sonotrode. These issues keep titanium and other metals from utilization in UAM. Accordingly, there are previously unaddressed and long-felt industry needs for methods and apparatus which improve upon conventional methods and apparatus.

SUMMARY

In some examples, provided is a method for bonding metals. In some examples, the method can include (i) diffusing a metallic interlayer into a first metallic surface of a first tangible object to stabilize a crystal structure in the first metallic surface, where the first metallic surface has a low symmetry crystal structure prior to bonding, (ii) placing a second metallic surface of a second tangible object in direct contact with the metallic interlayer, and (iii) imparting, using a sonotrode, compressive and shear forces to the first metallic surface and the second metallic surface, to cause plastic deformation that bonds the first metallic surface to the second metallic surface via the metallic interlayer.

In some embodiments, the crystal structure of the first metallic surface can be at least one of: (i) a body centered cubic crystal structure, (ii) a face centered cubic crystal structure, or (iii) a hexagonal close packed crystal structure.

In some examples, provided is a composition of metals produced by at least one of the methods provided herein.

In some examples, the second metallic surface can be comprised of the same metal as the first metallic surface. In an example, (i) the first metallic surface can include a first titanium surface, (ii) the metallic interlayer can include vanadium, and (iii) the second metallic surface can include a second titanium surface. In an example, at least one of the first titanium surface or the second titanium surface can include an alloy of titanium.

In some examples, the second metallic surface is comprised of a metal different than that of the first metallic surface. In an example, (i) the first metallic surface can be a titanium surface, and (ii) the metallic interlayer can include vanadium. In an example, the titanium surface can include an alloy of titanium.

In some embodiments, the metallic interlayer can include vanadium.

In some embodiments, the diffusing can reduce a thermodynamic phase transition temperature of the first metallic surface to stabilize the low symmetry crystal structure.

In some examples, the metallic interlayer can have a deformation-induced lattice defect vacancy concentration above an equilibrium value.

In some examples, provided is a non-transitory computer-readable medium configured to perform at least a portion of a method described herein.

In some embodiments, provided is a non-transitory computer-readable medium, including processor-executable instructions stored thereon configured to cause a processor to control at least a portion of: (i) diffusing a metallic interlayer into a first metallic surface of a first tangible object to stabilize a crystal structure in the first metallic surface, where the first metallic surface has a low symmetry crystal structure prior to bonding, (ii) placing a second metallic surface of a second tangible object in direct contact with the metallic interlayer, and (iii) imparting, using a sonotrode, compressive and shear forces to the first metallic surface and the second metallic surface, to cause plastic deformation that bonds the first metallic surface to the second metallic surface via the metallic interlayer. In some embodiments, the diffusing can reduce a thermodynamic phase transition temperature of the first metallic surface to stabilize the low symmetry crystal structure. In some examples, the metallic interlayer can have a deformation-induced lattice defect vacancy concentration above an equilibrium value.

In some examples, provided is a system configured to perform at least a portion of a method described herein.

In some examples, provided is a system for bonding metals. The system can include (i) a processor, and (ii) a memory device coupled to the processor and storing instructions. In some examples the instructions can be configured to cause the processor to control at least a portion of: (i) diffusing a metallic interlayer into a first metallic surface of a first tangible object to stabilize a crystal structure in the first metallic surface, where the first metallic surface has a low symmetry crystal structure prior to bonding, (ii) placing a second metallic surface of a second tangible object in direct contact with the metallic interlayer, and (iii) imparting, using a sonotrode, compressive and shear forces to the first metallic surface and the second metallic surface, to cause plastic deformation that bonds the first metallic surface to the second metallic surface via the metallic interlayer. In some examples, the diffusing can reduce a thermodynamic phase transition temperature of the first metallic surface to stabilize the low symmetry crystal structure. In some embodiments, the metallic interlayer can have a deformation-induced lattice defect vacancy concentration above an equilibrium value. In some examples, (i) the first metallic surface can include a first titanium surface, (ii) the metallic interlayer can include vanadium, and (iii) the second metallic surface can include a second titanium surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are presented to describe examples of the present teachings and are not limiting.

Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are methods and apparatuses for improved Ultrasonic Additive Manufacturing (UAM) of metals. In examples, the provided methods can be used to bond metallic surfaces having a hexagonal close packed crystal structure or other low symmetry crystal structure prior to bonding. The provided methods are scalable, cost effective, and have a variety of practical applications.

Titanium (Ti) is difficult to bond because Ti has a hexagonal close packed (HCP or α phase) crystal structure. The organization and structure of atoms in the α phase makes plastic deformation and slip very difficult. Since UAM bonding relies on plastic deformation to bond, the α phase resists bonding because the α phase resists plastic deformation. In examples, enhanced diffusion of atoms can increase bonding of Ti. Provided are methods that diffuse atoms into the Ti, to stabilize a different phase (e.g., a body centered cubic (BCC or β phase)) that is easier to plastically slip. The β phase has forty-eight different slip systems, while the α phase only has three. Therefore, when the β phase is stabilized, doing so greatly increases the ability of the material to plastically deform and bond. There are several elements that can stabilize the β phase in titanium, such as vanadium since vanadium is a pure β stabilizer (β eutectic stabilizers can also stabilize the β phase in titanium). Vanadium reduces the β transus point and stabilizes β with all concentrations. Other elements can also be used to stabilize β with small concentrations. In a non-limiting example, a thin layer of vanadium is sputtered on a titanium foil (e.g., to produce a vanadium interlayer) and then UAM bonded with another metal surface, such as titanium.

These techniques can produce enhanced interdiffusion of elements between the titanium and vanadium. These techniques can assist a strain induced phase transformation (α→β) during UAM bonding. Since plastic deformation is a requirement of UAM bonding, material phases that can easily plastically deform, such as the β phase, are extremely beneficial for improving the bonding. In examples, the provided methods can be performed using commercially pure titanium and Ti-6Al-4V alloy.

In an example, a provided method for bonding metals can include (i) disposing a layer of Vanadium onto a first Titanium surface of a first tangible object, (ii) placing a second Titanium surface of a second tangible object in direct contact with the layer of Vanadium, and (iii) imparting, using a sonotrode, compressive and shear forces to the first Titanium surface, the layer of Vanadium, and the second Titanium surface, to cause plastic deformation that bonds the first Titanium surface to the second Titanium surface. In an example, the first Titanium surface can include an alloy of titanium. Also provided is a composition of metals produced by this method.

In an example, a provided method for bonding dissimilar metals can include (i) disposing a layer of Vanadium onto a Titanium surface of a first tangible object, (ii) placing a metallic surface of a second tangible object in direct contact with the layer of Vanadium, where the metallic surface is comprised of at least one metal other than titanium, and (iii) imparting, using a sonotrode, compressive and shear forces to the Titanium surface, the layer of Vanadium, and the metallic surface, to cause plastic deformation that bonds the Titanium surface to the metallic surface. In an example, the Titanium surface can include an alloy of titanium. Also provided is a composition of dissimilar metals produced by this method.

In an example, a provided method for bonding dissimilar metals can include (i) diffusing a metallic interlayer into a first metallic surface of a first tangible object to stabilize a body centered cubic or face centered cubic crystal structure in the first metallic surface, where the first metallic surface has a hexagonal close packed crystal structure or other low symmetry crystal structure prior to bonding, (ii) placing a second metallic surface of a second tangible object in direct contact with the first metallic interlayer, where the second metallic surface is comprised of a metal different than that of the first metallic surface, and (iii) imparting, using a sonotrode, compressive and shear forces to the first metallic surface and second metallic surface, to cause plastic deformation that bonds the first metallic surface to the second metallic surface. Also provided is a composition of dissimilar metals produced by this method.

In an example, a provided method for bonding similar metals can include (i) diffusing a metallic interlayer into a first metallic surface of a first tangible object to stabilize a body centered cubic or face centered cubic crystal structure in the first metallic surface, where the first metallic surface has a hexagonal close packed crystal structure or other low symmetry crystal structure prior to bonding, (ii) placing a second metallic surface of a second tangible object in direct contact with the first metallic interlayer, where the second metallic surface is comprised of a metal similar to that of the first metallic surface, and (iii) imparting, using a sonotrode, compressive and shear forces to the first metallic surface and second metallic surface, to cause plastic deformation that bonds the first metallic surface to the second metallic surface. Also provided is a composition of similar metals produced by this method.

In an example, provided is a method for bonding metals, including reducing a thermodynamic phase transition temperature of a solvent metal to stabilize a low symmetry crystal structure. Also provided is a composition of metals produced by this method.

In an example, provided is a method for bonding metals, including diffusing metals enhanced with deformation-induced lattice defect vacancy concentrations above those of equilibrium values to improve bonding ability. Also provided is a composition of metals produced by this method.

In examples, provided methods adjust deformation behavior of titanium at the grain structure level with a specific interlayer composition. Used in tandem with UAM, a variety of different titanium alloys can be strongly bound together, as proven by various experimental methods. These same methods of modifying the deformation behavior can also be applied to other metals, allowing for innumerable combinations of dissimilar metals to be bonded using UAM techniques.

The examples disclosed hereby advantageously address the long-felt industry needs, as well as other previously unidentified needs, and mitigate shortcomings of conventional techniques. The examples disclosed hereby advantageously require only minor additions of specific interlayer material to achieve bonding benefits; have proven use with commercially pure titanium, as well as the popular Ti-6Al-4V alloy; can be applied to combinations of dissimilar metals or alloys to achieve enhanced elemental diffusion, and combinations thereof.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure and are not provided as limitations.

Figure 1:
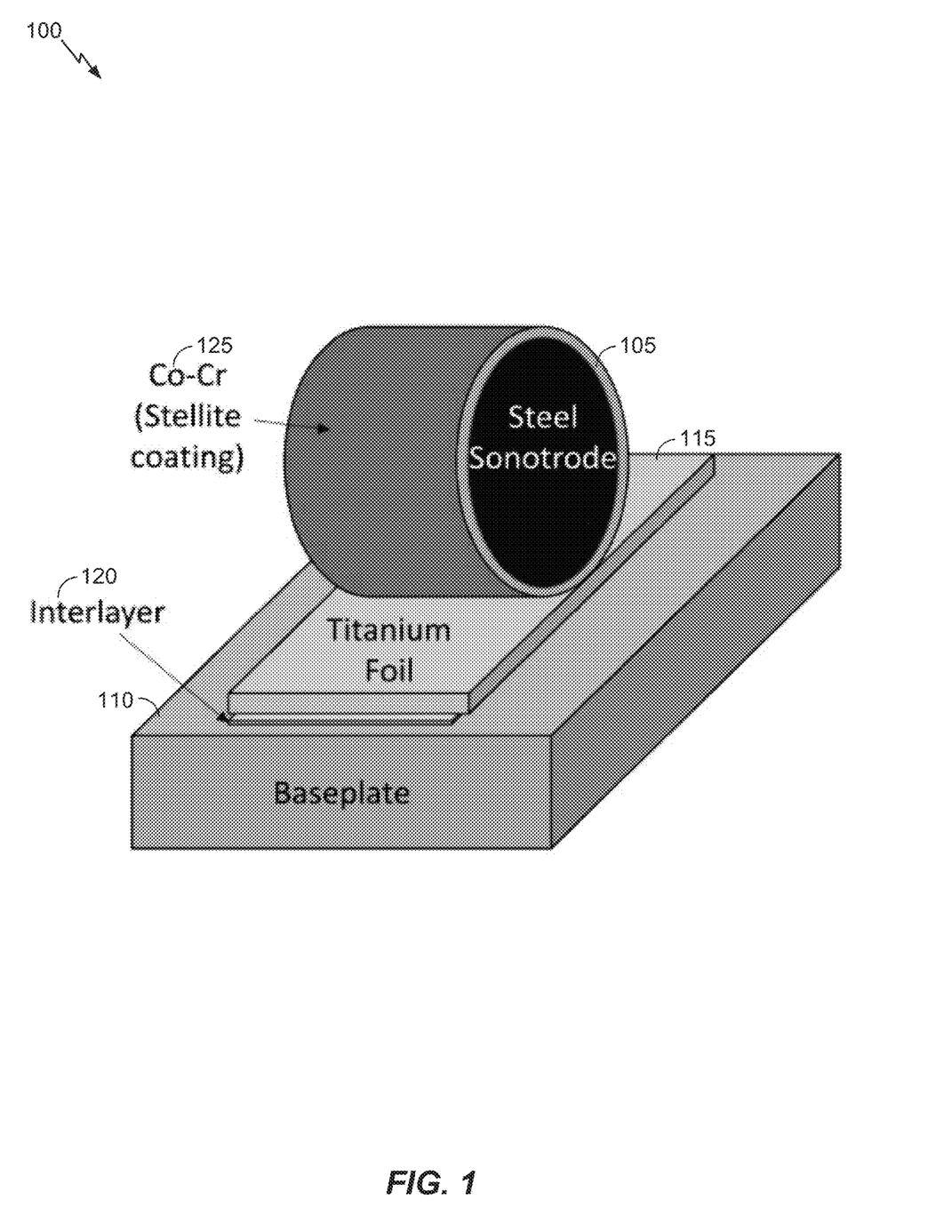
FIG. 1 depicts an example apparatus for performing Ultrasonic Additive Manufacturing of metals.
Figure 2:
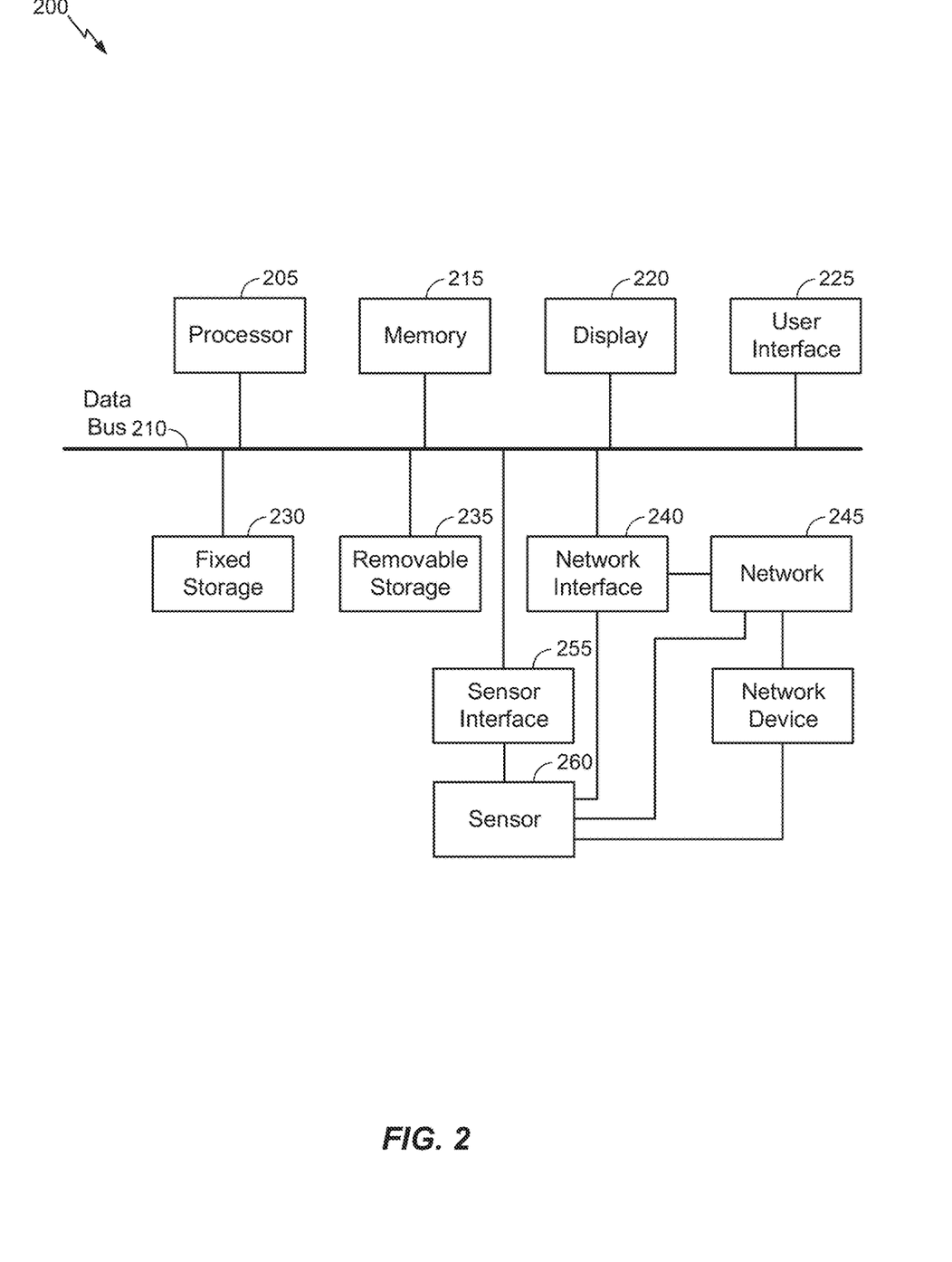
FIG. 2 depicts a block diagram of an example device suitable for implementing examples of the disclosed subject matter.

BCC—Body Centered Cubic
CP—Commercially Pure
$\tilde{D}$—range of elemental interdiffusivity
DP—Diffraction Pattern
EDS—Energy Dispersive Spectroscopy
FCC—Face Centered Cubic
HCP—Hexagonal Close Packed
kV—Kilovolt
N—Newton
SAD—Selected Area Diffraction
SEM—Scanning Electron Microscopy
STEM—Scanning Transmission Electron Microscopy
TEM—Transmission Electron Microscopy
Ti—Titanium
UAM—Ultrasonic Additive Manufacturing
$X_v$—Thermal equilibrium vacancy concentration This description provides, with reference to FIGS. 1 and 2, detailed descriptions of example apparatus for performing UAM of dissimilar metals. Detailed descriptions of an example method are provided in connection with FIG. 3. Detailed descriptions of examples of strain induced phase transformation that are supported by plastic deformation induced lattice defect vacancies during ultrasonic additive manufacturing are provided in connection with FIG. 4.

FIG. 1 depicts an example apparatus 100 for performing UAM of metals. The apparatus 100 is suitable for implementing examples of the disclosed subject matter. In some examples, the example apparatus for performing UAM of metals 100 can include a sonotrode 105, a baseplate 110, the like, or a combination thereof.

The sonotrode 105 is a tool that can apply ultrasonic vibrations, shear force, compressive force (e.g., in a range between 300 N to 9000 N, inclusive), or both to at least two metallic foils to bond (e.g. ultrasonically weld) the metallic foils together. Thus, a sonotrode can be used to ultrasonically fabricate a device at least one layer at a time, from metal foils, including from dissimilar metals. In non-limiting examples, the ultrasonic vibrations of the sonotrode can range in oscillation frequency between 15-300 kHz, inclusive. In some non-limiting examples, the ultrasonic vibrations of the sonotrode can be 20 kHz. In non-limiting examples, the ultrasonic vibrations of the sonotrode can have displacement oscillation amplitudes in a range between 20 μm to 50 μm, inclusive.

In examples, when applied to the at least two metallic foils, the sonotrode 105 can reduce a thermodynamic phase transition temperature of a solvent metal to stabilize a low symmetry crystal structure.

In some examples, when applied to the at least two metallic foils, the sonotrode 105 can diffuse metals enhanced with deformation-induced lattice defect vacancy concentrations above those of equilibrium values to improve bonding ability. The interlayer 120 can increase a deformation induced lattice defect vacancy concentration in a first metallic layer and in a second metallic layer. The interlayer 120 thus can advantageously assist in bonding the first metallic layer to the second metallic layer. The deformation induced lattice defect vacancy concentration does not necessarily occur in the interlayer material.

In an example of the bonding process depicted in FIG. 1, at least two metallic foils (e.g. titanium foil 115 and interlayer 120) can be placed on the baseplate 110 in direct contact with each other. The sonotrode 105 then is used to apply ultrasonic vibrations, shear force, compressive force, or both to both of the titanium foil 115 and the interlayer 120 at the same time to cause plastic deformation that bonds the metallic foils together. In an example, the sonotrode 105 can diffuse the interlayer 120 into a surface of the titanium foil 115 to stabilize a body centered cubic or face centered cubic crystal structure in the titanium foil 115, where the surface of the titanium foil 115 has a hexagonal close packed crystal structure or other low symmetry crystal structure prior to bonding.

During the bonding process, a cylindrical portion of the sonotrode 105 can roll upon a surface of at least one of the two metallic foils to bond the at least two metallic foils. In non-limiting examples, a sonotrode rolling speed over a metallic foil can be in a range between 30 in./min. to 390 in./min., inclusive. In some examples, the sonotrode rolling speed over metallic foil can be in a range between 50 in./min. to 200 in./min., inclusive. Following the bonding of the at least two metallic foils, the sonotrode 105 can be used to bond additional metallic foils to the at least two bonded metallic foils.

In an example, a metallic foil to be bonded can be titanium or vanadium. In a nonlimiting example, the sonotrode 105 can be used to bond the interlayer 120 to the titanium foil 115, and to also bond another layer of titanium foil to the interlayer 120, thus bonding two layers of titanium via the interlayer 120 and producing a composition of metals.

In a nonlimiting example, the sonotrode 105 can be used to bond the interlayer 120 to the titanium foil 115, and to also bond a layer of metal other than titanium to the interlayer 120, thus producing a composition of dissimilar metals.

In a nonlimiting example, the sonotrode 105 can be used to diffuse a metallic interlayer into a first metallic surface of a first tangible object to stabilize a body centered cubic or face centered cubic crystal structure in the first metallic surface, where the first metallic surface has a hexagonal close packed crystal structure or other low symmetry crystal structure prior to bonding. The sonotrode 105 can also be used to bond a second metallic surface of a second tangible object in direct contact with the metallic interlayer, where the second metallic surface is comprised of a metal different than that of the first metallic surface, thus bonding layers of dissimilar metals and producing a composition of metals.

In a nonlimiting example, the sonotrode 105 can be used to diffuse a metallic interlayer into a first metallic surface of a first tangible object to stabilize a body centered cubic or face centered cubic crystal structure in the first metallic surface, where the first metallic surface has a hexagonal close packed crystal structure or other low symmetry crystal structure prior to bonding. The sonotrode 105 can also be used to bond a second metallic surface of a second tangible object in direct contact with the metallic interlayer, where the second metallic surface is comprised of a metal that is the same as the first metallic surface, thus bonding layers of metals and producing a composition of metals.

In examples, the sonotrode 105 can include a Stellite (Co—Cr) coating 125 on at least a portion of a surface of the sonotrode 105 that is configured to contact at least a portion of a metal part to be acted upon by the sonotrode 105. The Stellite coating 125 can protect the sonotrode 105 from wear due to sliding of the sonotrode 105 on a part being bonded, such as a metallic foil, as well as to increase a galling threshold to keep the part being bonded from adhering to the sonotrode 105.

We now turn to FIG. 2.

FIG. 2 illustrates an example computing device 200 suitable for implementing examples of the disclosed subject matter. In examples, a computing device such as computing device 200 can control, monitor, sense, initiate, or a combination thereof: (i) an intensity of ultrasonic energy imparted by the sonotrode on materials located between the sonotrode and the baseplate, (ii) a frequency of ultrasonic energy imparted by the sonotrode on the materials located between the sonotrode and the baseplate, (iii) a compressive force imparted by the sonotrode on the materials located between the sonotrode and the baseplate, (iv) a rotational speed of the sonotrode, or (v) a combination thereof. In examples, a computing device such as computing device 200 can control, monitor, sense an aspect of, initiate, or a combination thereof at least a portion of a method described herein. In examples, a computing device such as computing device 200 can control, monitor, or a combination thereof at least a portion of a device described herein.

In examples, aspects of the computing device 200 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented using hardware devices, computer network devices, the like, or a combination thereof. The configuration depicted in FIG. 2 is an illustrative example and is not limiting.

In some examples, the computing device 200 can include a processor 205, a data bus 210, a memory 215, a display 220, a user interface 225, a fixed storage device 230, a removable storage device 235, a network interface 240, a network 245, a network device 250, a sensor interface 255, a sensor 260, the like, or a combination thereof. These elements are described in further detail herein.

The processor 205 can be a hardware-implemented processing unit configured to control at least a portion of operation of the computing device 200. The processor 205 can perform logical and arithmetic operations based on processor-executable instructions stored within the memory 215. The processor 205 can be configured to execute instructions which cause the processor 205 to initiate at least a part of a method described hereby. In an example, the processor 205 can interpret instructions stored in the memory 215 to initiate at least a part of a method described hereby. In an example, the processor 205 can execute instructions stored in the memory 215 to initiate at least a part of a method described hereby. The instructions, when executed by the processor 205, can transform the processor 205 into a special-purpose processor that causes the processor to perform at least a part of a function described hereby. The processor 205 may also be referred to as a central processing unit (CPU), a special-purpose processor (e.g., a non-generic processor), or both.

The processor 205 can comprise or be a component of a physical processing system implemented with one or more processors. In some examples, the processor 205 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 210 can couple components of the computing device 200. The data bus 210 can enable information communication between the processor 205 and one or more components coupled to the processor 205. In some examples, the data bus 210 can include a data bus, a power bus, a control signal bus, a status signal bus, the like, or a combination thereof. In an example, the components of the computing device 200 can be coupled together to communicate with each other using a different suitable mechanism.

The memory 215 generally represents any type or form of volatile storage device, non-volatile storage device, medium, the like, or a combination thereof. The memory 215 can store data, processor-readable instructions, the like, or a combination thereof. In an example, the memory 215 can store data, load data, maintain data, or a combination thereof. In an example, the memory 215 can store processor-readable instructions, load processor-readable instructions, maintain processor-readable instructions, or a combination thereof. In some embodiments, the memory 215 can store computer-readable instructions configured to cause a processor (e.g., the processor 205) to initiate performing at least a portion of a method described hereby. The memory 215 can be a main memory configured to store an operating system, an application program, the like, or a combination thereof. The memory 215 can be configured to store a basic input-output system (BIOS) which can control basic hardware operation such as interaction of the processor 205 with peripheral components. The memory 215 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 215 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof which is configured to store information (e.g., data, processor-readable instructions, software, the like, or a combination thereof) and is configured to provide the information to the processor 205.

The display 220 can include a component configured to visually convey information to a user of the computing device 200. In examples, the display 220 is a video display screen, such as a light-emitting diode (LED) screen.

The user interface 225 can include user devices such as a switch, a keypad, a touch screen, a microphone, a speaker, an audio reproduction device, a jack for coupling the computing device to an audio reproduction device, the like, or a combination thereof. The user interface 225 can optionally include a user interface controller. The user interface 225 can include a component configured to convey information to a user of the computing device 200, a component configured to receive information from the user of the computing device 200, or both.

The fixed storage device 230 can include one or more hard drive, flash storage device, the like, or a combination thereof. The fixed storage device 230 can be an information storage device which is not configured to be removed during use. The fixed storage device 230 can optionally include a fixed storage device controller. The fixed storage device 230 can be integral with the computing device 200 or can be separate and accessed through an interface.

The removable storage device 235 can be integral with the computing device 200 or can be separate and accessed through other interfaces. The removable storage device 235 can be an information storage device which is configured to be removed during use, such as a memory card, a jump drive, a flash storage device, an optical disk, the like, or a combination thereof. The removable storage device 235 can optionally include a removable storage device controller. The removable storage device 235 can be integral with the computing device 200 or can be separate and accessed through an interface.

In examples, a computer-readable storage medium such as one or more of the memory 215, the fixed storage device 230, the removable storage device 235, a remote storage location, the like, or a combination thereof can store non-transitory computer-executable instructions configured to cause a processor (e.g., the processor 205) to implement at least an aspect of the present disclosure.

The network interface 240 can couple the processor 205 (e.g., via the data bus 210) to the network 245 and enable exchanging information between the processor 205 and the network 245. In some examples, the network interface 240 can couple the processor 205 (e.g., via the data bus 210) to the network 245 and enable exchanging information between the processor 205 and the sensor 260. For example, the network interface 240 can enable the processor 205 to communicate with one or more other network devices 250. The network interface 240 can couple to the network 245 using any suitable technique and any suitable protocol. In some examples, the network interface 240 can include a data bus, a power bus, a control signal bus, a status signal bus, the like, or a combination thereof. Example techniques and protocols the network interface 240 can be configured to implement include digital cellular telephone, WiFi™, Bluetooth®, near-field communications (NFC), the like, or a combination thereof.

The network 245 can couple the processor 205 to one or more other network devices. In some examples, the network 245 can enable exchange of information between the processor 205 and the one or more other network devices 250. In some examples, the network 245 can enable exchange of information between the processor 205 and the sensor 260. The network 245 can include one or more private networks, local networks, wide-area networks, the Internet, other communication networks, the like, or a combination thereof. In some examples, the network 245 can be a wired network, a wireless network, an optical network, the like, or a combination thereof.

In some embodiments, the network device 250 can store computer-readable instructions configured to cause a processor (e.g., the processor 205) to initiate performing at least a portion of a method described hereby. In an example, the one or more other network devices 250 can store non-transitory computer-executable instructions configured to cause a processor (e.g., the processor 205) to implement at least an aspect of the present disclosure. The non-transitory computer-executable instructions can be received by the processor 205 and implemented using at least a portion of techniques described hereby.

In another example, information described hereby can be stored in the fixed storage device 230, the removable storage device 235, the network device 250, the like, or a combination thereof.

The network device 250 can include the sensor 260, a hardware device configured to couple the network 245 to the sensor 260, a server, a digital information storage device, the like, or a combination thereof.

In some examples, the network device 250 can include user devices such as a switch, a keypad, a touch screen, a microphone, a speaker, an audio reproduction device, a jack for coupling the computing device to an audio reproduction device, the like, or a combination thereof. The network device 250 can optionally include a user interface controller. The network device 250 can include a component configured to convey information to a user of the computing device 200, a component configured to receive information from the user of the computing device 200, or both.

In some examples, all the components illustrated in FIG. 2 need not be present to practice the present disclosure. Further, the components can be coupled in different ways from those illustrated.

The sensor interface 255 can couple the processor 205 (e.g., via the data bus 210) to the sensor 260. In some examples, the sensor interface 255 can couple the processor 205 (e.g., via the data bus 210) to the sensor 260 and enable exchanging information between the processor 205 and the sensor 260. For example, the sensor interface 255 can enable the processor 205 to receive, from the sensor 260, analog information and/or digital information describing at least one condition of a material to be bonded by a UAM technique, at least one condition of a material being bonded by a UAM technique, the like, or a combination thereof. The sensor interface 255 can couple to the sensor 260 using any suitable technique and any suitable protocol. In some examples, the sensor interface 255 can perform analog-to-digital conversion, digital-to-analog conversion, or a combination thereof. In some examples, the sensor interface 255 can include a data bus, a power bus, a control signal bus, a status signal bus, the like, or a combination thereof. Example techniques and protocols the sensor interface 255 can be configured to implement include digital cellular telephone, WiFi™, Bluetooth®, near-field communications (NFC), the like, or a combination thereof.

In examples, the sensor 260 can sense at least one condition of at least one material to be bonded by a UAM technique, at least one condition of at least one material being bonded by a UAM technique, at least one condition of a sonotrode, the like, or a combination thereof. In examples, the sensor 206 can detect a position of the at least one material to be bonded by the UAM technique, a frequency of ultrasonic vibrations of a sonotrode, a shear force applied by a sonotrode, a compressive force applied by a sonotrode, a sonotrode speed, a position of a sonotrode, or combination thereof. In examples, the sensor 260 can produce an analog output indicating the at least one state, a digital output indicating the at least one state, or both. The sensor 260 can produce an output of the at least one state using any suitable technique, any suitable protocol, or both. In some examples, the sensor 260 can perform analog-to-digital conversion, digital-to-analog conversion, or a combination thereof. In some examples, the sensor 260 can include an infrared camera, a data bus, a power bus, a control signal bus, a status signal bus, the like, or a combination thereof. Example techniques and protocols the sensor 260 can be configured to implement include digital cellular telephone, WiFi™, Bluetooth®, near-field communications (NFC), the like, or a combination thereof.

Figure 3:
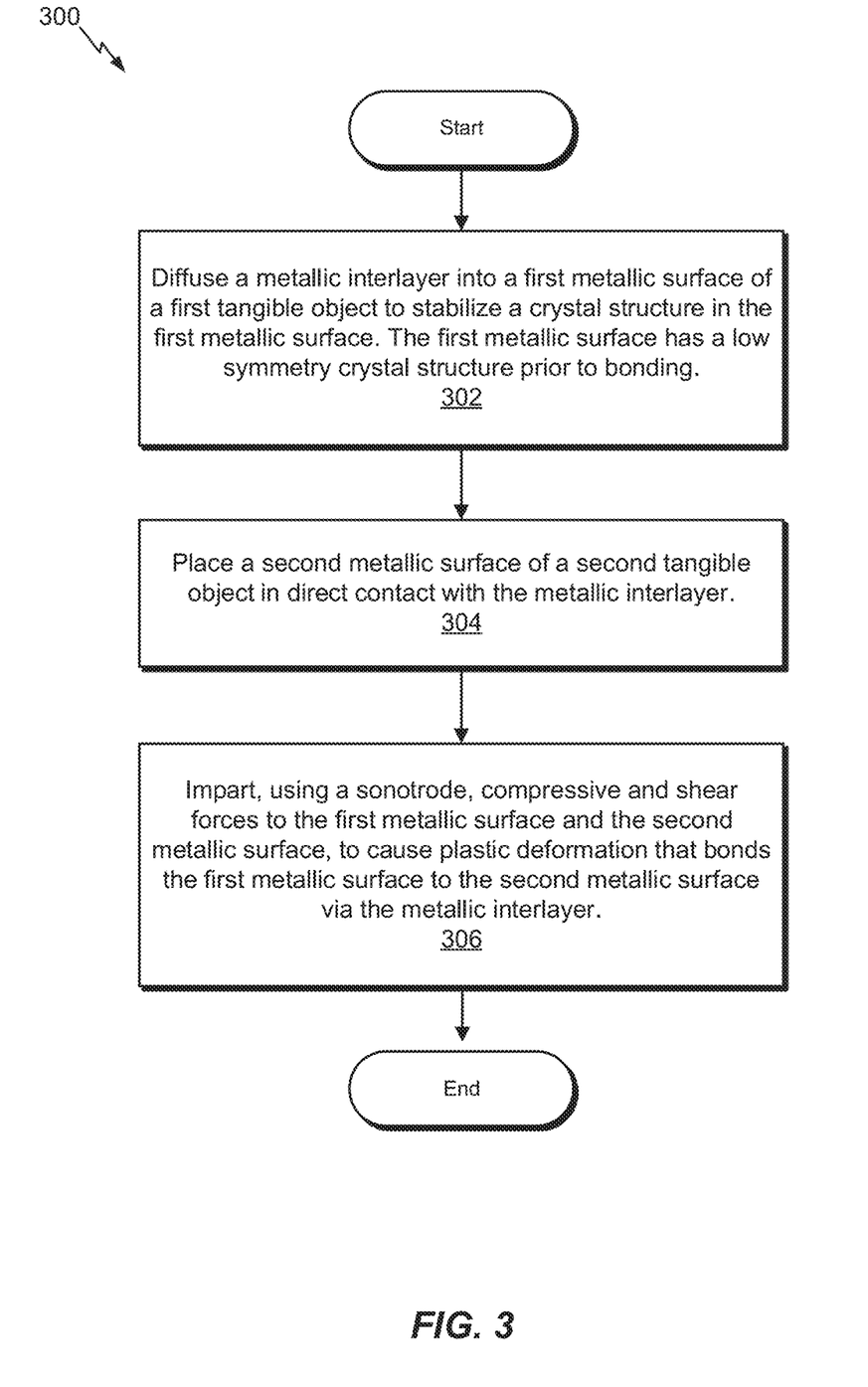
FIG. 3 depicts an example method for bonding similar metals.

We now turn to FIG. 3.

FIG. 3 depicts an example method 300 for bonding similar metals. The method 300 can be performed at least in part by the apparatus described hereby, such as the example apparatus for performing UAM of metals 100 in FIG. 1, the computing device 200 in FIG. 2, or a practicable combination thereof.

As illustrated in FIG. 3, at block 302, one or more of the devices described herein can diffuse a metallic interlayer into a first metallic surface of a first tangible object to stabilize a crystal structure in the first metallic surface. The first metallic surface can have a low symmetry crystal structure prior to bonding.

In some examples, the crystal structure of the first metallic surface can be at least one of (i) a body centered cubic crystal structure, (ii) a face centered cubic crystal structure, or (iii) a hexagonal close packed crystal structure.

In some examples, the first metallic surface can include a first titanium surface. In some embodiments, the first titanium surface can include an alloy of titanium.

In some examples, the metallic interlayer can include vanadium. The material forming the metallic interlayer can be chosen to be an alloying addition to main bonding layers (e.g. where the main bonding layers are a first metallic surface and a second metallic surface) that can (1) induce creation of deformation induced vacancies that can increase the interdiffusion of elements, and (2) increase a propensity to form a high symmetry crystal structure in the main bonding layer material.

The metallic interlayer can be diffused into the first metallic surface of the first tangible object by UAM bonding, sputtering, the like, or combination thereof.

In some embodiments, the diffusing step can reduce a thermodynamic phase transition temperature of the first metallic surface to stabilize the low symmetry crystal structure. In some examples, the metallic interlayer can have a deformation-induced lattice defect vacancy concentration above an equilibrium value.

As illustrated in FIG. 3, at block 304, one or more of the devices described herein can place a second metallic surface of a second tangible object in direct contact with the metallic interlayer.

In some embodiments, the second metallic surface can be comprised of the same metal (e.g., a commercially pure element, and alloy, etc.) as the first metallic surface. In some examples, the second metallic surface can include a second titanium surface. In some embodiments, the second titanium surface can include an alloy of titanium.

In some examples, the second metallic surface can include a metal different than that of the first metallic surface.

As illustrated in FIG. 3, at block 306, one or more of the devices described herein can impart, using a sonotrode, compressive and shear forces to the first metallic surface and the second metallic surface, to cause plastic deformation that bonds the first metallic surface to the second metallic surface via the metallic interlayer.

Also provided is a composition of metals produced as a result of performing the method 300.

Figure 4:
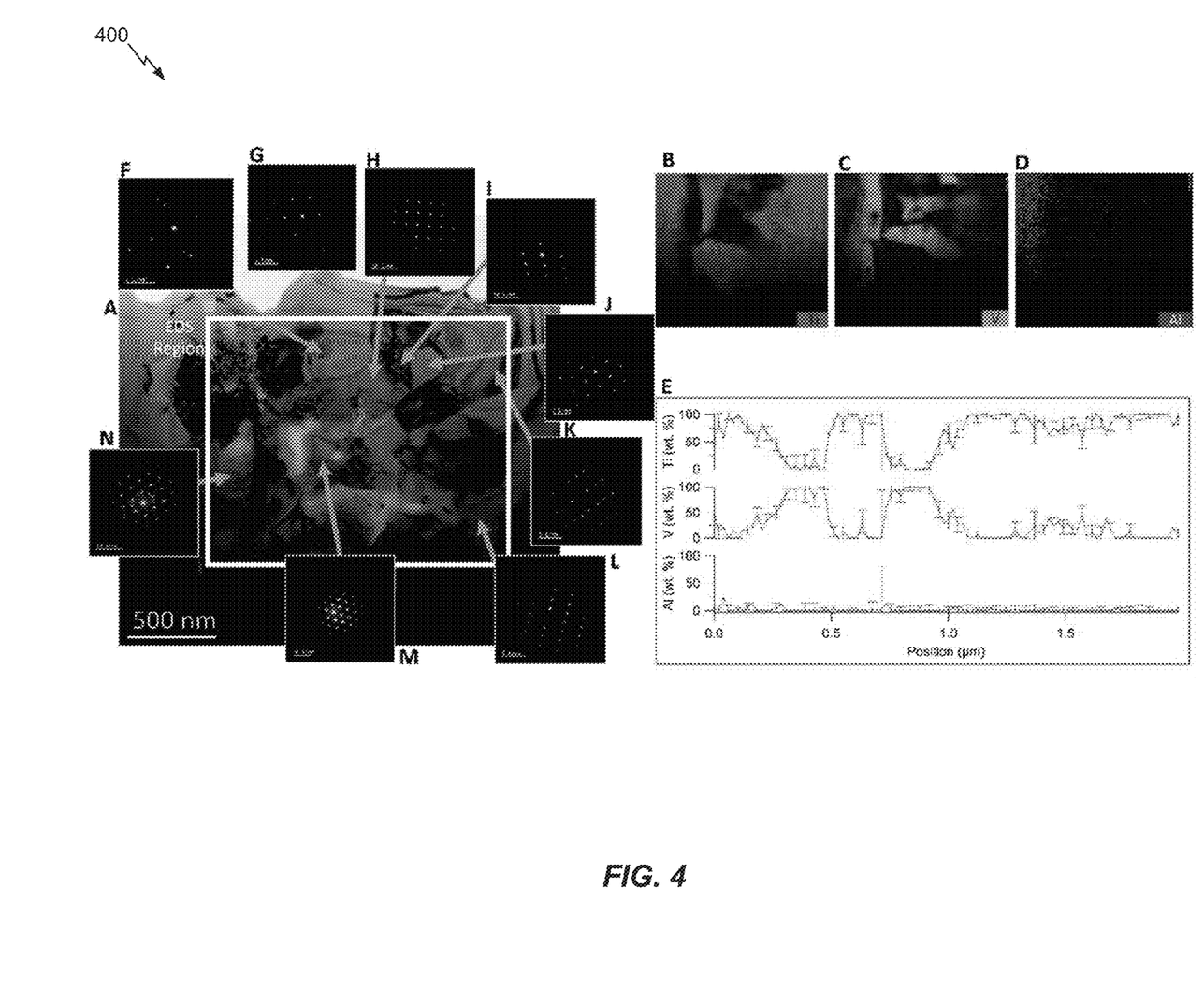
FIG. 4 depicts examples describing strain induced phase transformation that is supported by plastic deformation induced lattice defect vacancies during ultrasonic additive manufacturing.

We now turn to FIG. 4.

FIG. 4 depicts features 400 of non-limiting examples describing strain induced phase transformation that is supported by plastic deformation induced lattice defect vacancies during ultrasonic additive manufacturing. TEM analysis of titanium with sputtered vanadium after successful bonding. FIG. 4 includes images "A" through "N." Image "A" depicts a TEM image of an interface region. Image "B" depicts an Energy Dispersive Spectroscopy (EDS) map of titanium. Image "C" depicts an EDS map of vanadium. Image "D" depicts an EDS map of aluminum. Image "E" depicts an EDS line scan across the indicated region. Images "F" through "N" depict SAD diffraction patterns from indicated grains.

Sample preparation for transmission electron microscopy (TEM) can be performed using focused ion beam/SEM Thermo Fisher Helios 5CX with a gallium-ion beam progressing from energies of 30 kV to 5 kV. TEM, scanning transmission electron microscopy (STEM), and EDS in the TEM can be performed on an FEI Tecnai F30. The commercially pure titanium (CP Ti) foil with sputtered vanadium can then be bonded to a Ti-6Al-4V baseplate, and the interface can be analyzed, as depicted in images "A" through "N" of FIG. 4. The provided techniques can be used to improve a bonding ability of difficult to weld materials, such as titanium, during ultrasonic additive manufacturing.

Using transmission electron microscopy (TEM), a material interface can be seen in Image "A" of FIG. 4 on the left side of the image with significantly smaller and more deformed grains. This is likely due to severe plastic deformation and dynamic recrystallization.

The elemental concentration can be seen in Images "B" through "D" of FIG. 4. The Ti-6Al-4V baseplate is on the left side of the image as indicated by the higher concentrations of titanium, aluminum, and vanadium. The sputtered vanadium interlayer can be observed by the high concentration of vanadium near the interface. Higher concentrations of vanadium can also be observed in several grains to the right of the interface.

An EDS line scan is shown in Image "E" of FIG. 4 progressing from left to right across the image "A" within a region denoted by a white box. The error bars in Image "E" of FIG. 4 represent a statistical error from calculating an elemental concentration at each point. An elemental interdiffusion profile can be observed between the vanadium and the titanium.

Selected area diffraction (SAD) patterns were taken at several grains of interest, as depicted in Images "F" through "N" in FIG. 4.

Image "F" of FIG. 4 is a SAD pattern in the indicated titanium grain. Using the standard lattice parameter for titanium ($a_0$: 0.295 nm and c/a: 1.587) the diffraction pattern (DP) can be indexed as being near the HCP [5$\bar{1}$43] zone axis. A lattice parameter of 0.311 nm±0.003 nm can be calculated across three g vectors indicating a 5.5% error from the expected lattice parameter.

Image "G" of FIG. 4 is a SAD pattern in another titanium grain. The DP can be indexed as being near the HCP [1$\bar{2}$1$\bar{3}$] zone axis. A lattice parameter of 0.310 nm±0.003 nm can also be calculated across three g vectors indicating a 5.1% error from expected.

Image "H" of FIG. 4 is a SAD pattern in a titanium-vanadium mixture grain. Indexing the DP grain assuming it is near the BCC [001] zone axis provides the lowest calculated error. A lattice parameter of 0.315 nm±0.008 nm is found, which has 3% error from the standard lattice parameter in BCC Ti ($a_0$: 0.325 nm). It was also considered if the DP could be FCC Ti near the [001] zone axis, although a lattice parameter of 0.446 nm±0.011 nm was found, which has an error of 9.8% from the standard in FCC Ti ($a_0$: 0.406 nm). This grain cannot be HCP near the [10$\bar{1}$1] zone axis as a lattice parameter of 0.344±0.13 nm was calculated, which is a 25.4% error from standard HCP Ti.

Image "I" of FIG. 4 is a SAD pattern in another titanium-vanadium mixture grain. This DP is indexed as being a BCC structure near the [$\bar{1}$13] zone axis ($a_0$: 0.334 nm±0.003 nm with 2.9% error). Consideration of the FCC structure near the [$\bar{1}$13] zone axis yields a larger error and is less likely correct ($a_0$: 0.669 nm±0.006 nm with 64.7% error).

The SAD pattern in Image "J" of FIG. 4 is also from a region with a titanium-vanadium mixture. It is likely the near the BCC [111] zone axis ($a_0$: 0.335 nm±0.005 nm with 3.5% error). It could also be near the HCP [0001] zone axis ($a_0$: 0.263 nm±0.014 nm with 6.9% error) although that is less likely. It is unlikely to be the near the FCC [111] zone axis since the calculated lattice parameter is a0: 0.672 nm±0.006 nm with 65.7% error.

The SAD pattern in Image "K" of FIG. 4 is from a grain of titanium. The indexed DP is near the HCP [2$\bar{1}$$\bar{1}$0] zone axis ($a_0$: 0.313 nm±0.005 nm with 6.4% error). This diffraction pattern shows a faint spot at the (0001) plane, although it should be invisible. An additional diffraction event may have occurred or another element, such as vanadium, could be present in minor amounts on this plane resulting in the visible spot.

Image "L" of FIG. 4 is a SAD pattern from another grain of titanium. The DP has also been indexed as being near the HCP [2$\bar{1}$$\bar{1}$0] zone axis ($a_0$: 0.309 nm±0.001 nm with 5.0% error).

Image "M" of FIG. 4 is a SAD pattern from a severely deformed grain of vanadium near the interface. The indexed diffraction pattern assuming it in near the BCC [111] zone axis has a lattice parameter of $a_0$: 0.314 nm±0.003 nm with 3.8% error from the expected value of vanadium ($a_0$: 0.303 nm). It is unlikely to be the HCP [0001] zone axis as the calculated lattice parameter is 0.257 nm±0.002 nm with a 13% error. A calculated lattice parameter for an FCC [111] zone axis is more inaccurate, suggesting this is not the crystal structure either ($a_0$: 0.629 nm±0.005 nm with 54.9% error).

Finally, Image "N" of FIG. 4 is a SAD pattern from a deformed grain of sputtered vanadium near the interface. A calculated lattice parameter of 0.314 nm±0.003 nm with a 3.4% error is found for the BCC [111] zone axis. Like the previous grain, it is unlikely to be the HCP [0001] zone axis ($a_0$: 0.256 nm±0.002 nm with 13.1% error) or an FCC [111] zone axis ($a_0$: 0.628 nm±0.006 nm with 54.7% error).

Ultrasonic Additive Manufacturing is a solid-state, low time, and low temperature bonding process. Through the use of thermocouples and thermal imaging cameras, the total thermal cycle is approximately 0.5 seconds. The EDS compositions using Image "E" of FIG. 4 and those obtained by experimentation using the provided techniques demonstrate that a cross diffusional distance of 0.2 to 2 μm can be present, which also varies depending on the spatial location. Using Fick's $2^{nd}$ law and the observed cross diffusional distances, the range of elemental interdiffusivity, $\tilde{D}$, that was reached during bonding is $2\times10^{-13}$ to $2\times10^{-11}$ m$^2$/s. UAM studies of other materials using thermocouples, thermal imaging cameras, and HCP crystallography studies have estimated that a thermal profile reaching as high as 400° C. could be present. The thermal equilibrium $\tilde{D}$ of α-Ti and β-Ti can be compared at room temperature and 400° C. Using these temperatures, the interdiffusivity in α or β titanium can be considered and compared with the observed value in Table 1. The observed cross diffusion is orders of magnitude larger than what can be explained using thermal equilibrium. The only viable method of describing the accelerated diffusion pathways in UAM are significant concentrations of vacancies. Thermal equilibrium vacancy concentrations, $X_v$, can be calculated for the α and β titanium phases. Since the vacancy formation energy is α is higher than in β, it is more energetically feasible for vacancies to form in the β phase. Thus, a phase transformation occurred first, followed by significant vacancy formation for interdiffusion. The $X_v$ that must have been created for the observed cross diffusion is described in Table 1. Regardless of the actual temperature reached during UAM, significantly elevated concentrations of vacancies must have been created during the deformation UAM bonding process.

TABLE 1

Elemental Interdiffusivity and Vacancy Concentrations During UAM

| Temp. (° C.) | Equil. $\tilde{D}$, α-Ti (m$^2$/s) | Equil. $\tilde{D}$, β-Ti (m$^2$/s) | Obs. $\tilde{D}$ (m$^2$/s) | Equil. $X_v$, α-Ti | Equil. $X_v$, β-Ti | UAM Induced $X_v$ in β-Ti |
|---|---|---|---|---|---|---|
| 25 | $6 \times 10^{-48}$ | $5 \times 10^{-18}$ | | $5 \times 10^{-34}$ | $2.5 \times 10^{-19}$ | $2 \times 10^{-3}$ to $2 \times 10^{-1}$ |
| 400 | $3 \times 10^{-23}$ | $2 \times 10^{-16}$ | | $2 \times 10^{-15}$ | $5.8 \times 10^{-9}$ | $3 \times 10^{-6}$ to $3 \times 10^{-4}$ |
| | | | $2 \times 10^{-11}$-$2 \times 10^{-13}$ | | | |

As depicted in the Images in FIG. 4, the titanium in this example transformed from the α phase to the β phase due to the UAM deformation bonding. The phase transformation can be rationalized through the introduction of elements and by the plastic strain induced Gibbs free energy change in the material. In pure titanium, as per thermodynamic calculations, the onset of $T_\beta$ is calculated to be 881.4° C., although this temperature can change with the addition of foreign elements. The rate of $T_\beta$ reduction as a function of solute fraction (~2%) can be calculated using the Thermo-calc® program using the TCTI2 module: $d(T_\beta)/d(wt.\ fraction\ V)=-1595$. Vanadium decreases $T_\beta$ as the vanadium is added to titanium (hence the negative $d(T_\beta)/d(wt.\ fraction\ solute)$ value). Vanadium is an allotropic beta stabilizing element for titanium. This indicates that at all concentrations of vanadium in titanium, $T_\beta$ will continuously decrease. Additionally, the vacancy formation energy in β-Ti is lower than in α-Ti (α-Ti: 1.97 eV vs β-Ti: 1.1 eV). Therefore, as the deformation induced phase transformation occurs, higher concentrations of vacancies can be created, which can further enhance elemental interdiffusion.

As used hereby, the term "example" means "serving as an example, instance, or illustration". Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

At least a portion of the methods, sequences, algorithms, or a combination thereof that are described in connection with the examples disclosed hereby can be performed, controlled, initiated, or a combination thereof directly by hardware, by instructions executed by a processor (e.g., a microprocessor, an application specific integrated circuit (ASIC)), or in a combination thereof. In an example, a processor includes multiple discrete hardware components. Instructions can reside in a non-transient storage medium (e.g., a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), any other form of storage medium, the like, or a combination thereof. An example storage medium (e.g., a memory device) can be coupled to the processor so the processor can read information from the storage medium, write information to the storage medium, or both. In an example, the storage medium can be integral with the processor.

Additionally, computer instructions configured to perform, control, initiate, or a combination thereof a sequence of actions described hereby can be stored on a non-transitory computer-readable storage medium. The computer instructions which, upon execution, can cause an associated processor (such as a special-purpose processor) to perform at least a portion of a function described hereby. Additionally, computer instructions configured to perform, control, initiate, or a combination thereof a sequence of actions described hereby can be stored on a non-transitory computer-readable storage medium having stored thereby a corresponding set of instructions that, upon execution, configure the processor to create specific logic circuits. Thus, examples may be in a number of different forms, all of which have been contemplated to be within the scope of the disclosure. In addition, for each of the examples described hereby, a corresponding electrical circuit of any such examples may be described hereby as, for example, "a logic circuit configured to" perform a described action, control a described action, initiate a described action, or a combination thereof.

In an example, when a general-purpose computer (e.g., a processor) can be configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method described hereby. In an example, a combination of two or more related method steps disclosed hereby forms a sufficient algorithm. In an example, a sufficient algorithm constitutes special programming. In an example, special programming constitutes any software which can cause a computer (e.g., a general-purpose computer, a special-purpose computer, etc.) to be configured to perform, control, initiate, or a combination thereof one or more functions, features, steps, algorithms, blocks, or a combination thereof, as disclosed hereby.

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby.

The present disclosure is not intended to be limited to the specifically disclosed examples alone.

What is claimed is:

1. A method for bonding metals, comprising:
   diffusing a metallic interlayer into a first metallic surface of a first tangible object to stabilize a crystal structure in the first metallic surface, wherein the first metallic surface has a hexagonal close packed crystal structure prior to the diffusing;
   placing, following the diffusing step, a second metallic surface of a second tangible object in direct contact with the metallic interlayer, wherein the second metallic surface is comprised of a metal different than that of the first metallic surface; and
   imparting, using a sonotrode, compressive and shear forces to the first metallic surface and the second metallic surface, to cause plastic deformation that bonds the first metallic surface to the second metallic surface via the metallic interlayer.

2. The method of claim 1, wherein the second metallic surface comprises Ti-6Al-4V.

3. The method of claim 1, wherein:
   the first metallic surface is a titanium surface; and
   the metallic interlayer comprises vanadium.

4. The method of claim 3, wherein the titanium surface comprises an alloy of titanium.

5. The method of claim 1, wherein the metallic interlayer is comprised of vanadium.

6. The method of claim 1, wherein:
   the first metallic surface has a body centered cubic crystal structure after the diffusing; and
   the diffusing reduces a thermodynamic phase transition temperature of the first metallic surface to stabilize the body centered cubic crystal structure.

7. The method of claim 1, wherein the metallic interlayer has a deformation-induced lattice defect vacancy concentration above an equilibrium value.

8. A non-transitory computer-readable medium, comprising processor-executable instructions stored thereon configured to cause a processor to control:
   diffusing a metallic interlayer into a first metallic surface of a first tangible object to stabilize a crystal structure in the first metallic surface, wherein the first metallic surface has a hexagonal close packed crystal structure prior to the diffusing;
   placing, following the diffusing step, a second metallic surface of a second tangible object in direct contact with the metallic interlayer, wherein the second metallic surface is comprised of a metal different than that of the first metallic surface; and
   imparting, using a sonotrode, compressive and shear forces to the first metallic surface and the second metallic surface, to cause plastic deformation that bonds the first metallic surface to the second metallic surface via the metallic interlayer.

9. The non-transitory computer-readable medium of claim 8, wherein:
   the first metallic surface has a body centered cubic crystal structure after the diffusing; and
   the diffusing reduces a thermodynamic phase transition temperature of the first metallic surface to stabilize the body centered cubic crystal structure.

10. The non-transitory computer-readable medium of claim 8, wherein the metallic interlayer has a deformation-induced lattice defect vacancy concentration above an equilibrium value.

11. The method of claim 1, wherein the diffusing comprises diffusing the metallic interlayer into the first metallic surface of the first tangible object by sputtering.

12. The method of claim 1, wherein the diffusing comprises diffusing the metallic interlayer into the first metallic surface of the first tangible object by ultrasonic additive manufacturing bonding.

13. The method of claim 1, wherein the first metallic surface is a titanium surface.

14. The non-transitory computer-readable medium of claim 8, wherein the second metallic surface comprises Ti-6Al-4V.

15. The non-transitory computer-readable medium of claim 8, wherein:
   the first metallic surface is a titanium surface; and
   the metallic interlayer comprises vanadium.

16. The method of claim 15, wherein the titanium surface comprises an alloy of titanium.

17. The non-transitory computer-readable medium of claim 8, wherein the metallic interlayer comprises vanadium.

18. The non-transitory computer-readable medium of claim 8, wherein the diffusing comprises diffusing the metallic interlayer into the first metallic surface of the first tangible object by sputtering.

19. The non-transitory computer-readable medium of claim 8, wherein the diffusing comprises diffusing the metallic interlayer into the first metallic surface of the first tangible object by ultrasonic additive manufacturing bonding.

* * * * *